(12) United States Patent
Guhde et al.

(10) Patent No.: US 9,896,850 B2
(45) Date of Patent: Feb. 20, 2018

(54) THERMOPLASTIC-BASED BUILDING PRODUCT AND RELATED METHODS

(71) Applicant: Americhem, Inc., Cuyahoga Falls, OH (US)

(72) Inventors: Brian Guhde, Stow, OH (US); Craig Dennis, New Franklin, OH (US); Charles Pratt, Gig Harbor, WA (US)

(73) Assignee: Americhem, Inc., Cuyahoga Falls, OH (US)

( * ) Notice: Subject to any disclaimer, the term of this patent is extended or adjusted under 35 U.S.C. 154(b) by 191 days.

(21) Appl. No.: 14/697,679

(22) Filed: Apr. 28, 2015

(65) Prior Publication Data

US 2015/0308115 A1    Oct. 29, 2015

Related U.S. Application Data

(60) Provisional application No. 61/985,428, filed on Apr. 28, 2014, provisional application No. 61/985,439, filed on Apr. 28, 2014.

(51) Int. Cl.
  *E04C 2/22*   (2006.01)
  *E04F 13/08*  (2006.01)
  *C08L 67/02*  (2006.01)
(52) U.S. Cl.
  CPC .......... *E04F 13/0866* (2013.01); *C08L 67/02* (2013.01)

(58) Field of Classification Search
  CPC .................................................. E04F 13/0866
  USPC ........................................................... 428/76
  See application file for complete search history.

(56) References Cited

U.S. PATENT DOCUMENTS

| | | | | |
|---|---|---|---|---|
| 4,130,686 | A | * 12/1978 | Takahashi | B65D 63/10 24/16 PB |
| 6,164,032 | A | 12/2000 | Beck | |
| 2006/0111472 | A1 | 5/2006 | Boutelle et al. | |
| 2012/0177861 | A1* | 7/2012 | Eleazer | B32B 5/022 428/56 |

FOREIGN PATENT DOCUMENTS

WO      2007008663      1/2007

* cited by examiner

*Primary Examiner* — Brent T O'Hern
(74) *Attorney, Agent, or Firm* — Calfee, Halter & Griswold, LLP

(57) ABSTRACT

One exemplary embodiment is directed to a thermoplastic-based building product having a front face with a length and a width, an opposing back face, opposing top and bottom edges each with a thickness. The building product comprises at least one thermoplastic-based support layer, and at least one reinforcing flexing layer having a coefficient of linear thermal expansion (CLTE) of less than or equal to about 15 ppm/° C. over the temperature range of −20° C. to 70° C. The at least one reinforcing flexing layer is at least partially embedded in the at least one thermoplastic-based support layer along a longitudinal axis of the building product.

22 Claims, 2 Drawing Sheets

THERMOPLASTIC-BASED BUILDING PRODUCT AND RELATED METHODS

CROSS-REFERENCE TO RELATED APPLICATIONS

This application claims priority to and any benefit of U.S. Provisional Application No. 61/985,428, filed Apr. 28, 2014 and U.S. Provisional Application No. 61/985,439, filed Apr. 28, 2014, the entire contents of which are incorporated by reference in their entireties.

FIELD

The present disclosure is directed to thermoplastic-based building products, such as thermoplastic-based wall boards, thermoplastic-based composite decking, and other elongated thermoplastic-based building materials, and related methods for preparing the thermoplastic-based building products.

BACKGROUND

Traditional vinyl siding products for exterior building use became popular in the 1970s as an alternative to aluminum siding with sales steadily increasing over the following decades. As compared to other alternatives for exterior building cladding such as fiber cement, vinyl siding has the advantages of being relatively lighter in weight, easier to install, and not requiring painting. Vinyl siding is comprised primarily of polyvinyl chloride and is generally made by a continuous extrusion process whereby layers of thermoplastic polymer (e.g., polyvinyl chloride, poly(methyl methacrylate), or acrylonitrile styrene acrylate) are co-extruded with a layer containing additional additives designed to provide a more weather-resistant surface.

SUMMARY

One exemplary embodiment is directed to a thermoplastic-based building product having a front face with a length and a width, an opposing back face, opposing top and bottom edges each with a thickness. The building product comprises at least one thermoplastic-based support layer, and at least one reinforcing flexing layer having a coefficient of linear thermal expansion (CLTE) of less than or equal to about 15 ppm/° C. over the temperature range of −20° C. to 70° C. The at least one reinforcing flexing layer is at least partially embedded in the at least one thermoplastic-based support layer along a longitudinal axis of the building product.

An additional exemplary embodiment is directed to a thermoplastic-based building product having a front face with a length and a width, an opposing back face, opposing top and bottom edges each with a thickness. The building product comprises at least one thermoplastic-based support layer comprising a thermoplastic polymer selected from at least one of polyvinyl chloride, polyethylene, polypropylene, and combinations thereof; and at least one reinforcing flexing layer comprising a fiberglass impregnated tape containing unidirectional continuous fiberglass fibers. The at least one reinforcing flexing layer is embedded substantially in the center of the at least one thermoplastic-based support layer along a longitudinal axis of the building product, wherein the at least one reinforcing flexing layer has a CLTE of less than or equal to about 15 ppm/° C. over the temperature range of −20° C. to 70° C. The building product has a CLTE of about 7 to about 45 ppm/° C. over the temperature range of −20° C. to 70° C.

Another exemplary embodiment is directed to a method for preparing a thermoplastic-based building product having a front face with a length and a width, an opposing back face, opposing top and bottom edges each with a thickness. The method comprises (a) preparing at least one thermoplastic-based support layer; (b) bonding at least one reinforcing flexing layer to at least one surface of the at least one thermoplastic-based support layer, and (c) optionally bonding at least one outermost top layer to a surface of the at least one reinforcing flexing layer or to a surface of the at least one thermoplastic-based support layer.

In accordance with the embodiments of the present disclosure, the thermoplastic-based building product includes thermoplastic-based wall boards, such as exterior cladding (e.g., vinyl siding), thermoplastic-based composite decking, and other elongated thermoplastic-based building materials.

Another exemplary embodiment is directed to a thermoplastic-based wall board having a front face with a length and a width, an opposing back face, opposing top and bottom edges each with a thickness. The wall board comprises at least one thermoplastic-based support layer having an average thickness of about 10 mils to about 490 mils, including about 40 mils to about 400 mils, including about 50 mils to about 350 mils, including about 70 mils to about 250 mils, and including about 100 mils to about 150 mils; at least one reinforcing flexing layer bonded to a surface of at least one thermoplastic-based support layer having an average thickness of about 10 mils to about 30 mils, including about 10 mils to about 20 mils; and optionally at least one outermost top layer having a thickness of about 1 mil to about 10 mils bonded to a surface of the at least one reinforcing flexing layer or to a surface of the at least one thermoplastic-based support layer.

Another exemplary embodiment is directed to a method for preparing a thermoplastic-based wall board having a front face with a length and a width, an opposing back face, opposing top and bottom edges each with a thickness. The method comprises (a) preparing at least one thermoplastic-based support layer having an average thickness of about 10 mils to about 490 mils, including about 40 mils to about 400 mils, including about 50 mils to about 350 mils, including about 70 mils to about 250 mils, and including about 100 mils to about 150 mils; (b) bonding at least one reinforcing flexing layer having a thickness of about 10 mils to about 30 mils, preferably about 10 mils to about 20 mils, to at least one surface of the at least one thermoplastic-based support layer, and (c) optionally bonding at least one outermost top layer having a thickness of about 1 mils to about 10 mils to a surface of the at least one reinforcing flexing layer or to a surface of the at least one thermoplastic-based support layer.

DETAILED DESCRIPTION

Figure 1:
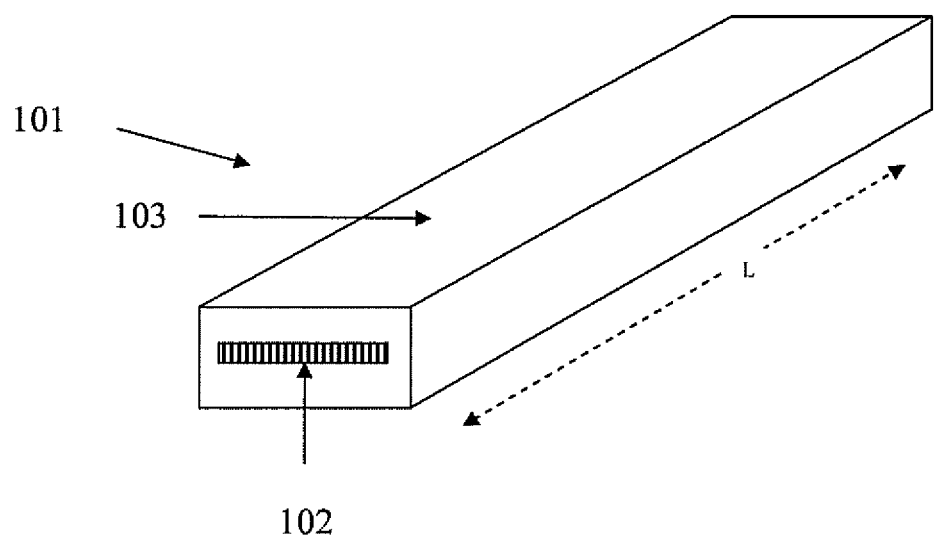
FIG. 1 shows a perspective view of an exemplary thermoplastic-based building product according to the present disclosure.

Unless otherwise indicated herein, all CLTE values refer to those over the temperature range of −20° C. to 70° C. and measured in accordance with ASTM E831.

Unless otherwise indicated herein, the term "thermoplastic" as used herein refers to that generally understood in the art: plastic material, typically a polymer, that becomes pliable or moldable above a specific temperature and solidifies upon cooling. Typically, thermoplastic materials are reusable or recyclable. This is in contrast to a thermoset, which as used herein, refers to a plastic material, typically a polymer, that irreversibly cures (i.e., crosslinks) and thus cannot be reshaped or remolded following cure.

The present disclosure is directed to thermoplastic-based building products, such as thermoplastic-based wall boards, thermoplastic-based composite decking, and other elongated-type thermoplastic-based building materials, and related methods for preparing the thermoplastic-based building products, particularly for exterior building products. After installation upon an exterior building surface, certain building products, particularly elongated-type building products, may be prone to buckling and other distortions or damage (e.g., camber) caused by the material of the product expanding and contracting, especially when exposed to extreme temperatures or extreme temperature changes. As used herein, "elongated" refers to products having a substantially greater length as compared to width, including lengths that are greater than 50%, including greater than 60%, including greater than 70%, including greater than 80%, including greater than 90%, including greater than 95%, and including greater than 99% as compared to the widths. The thermoplastic-based building products of the present disclosure reduce or at least minimize such buckling or other distortions by reducing the expansion and/or contraction of thermoplastic-based materials of the building products. Furthermore, by reducing the expansion and/or contraction of thermoplastic-based materials of the building products, the load on the fasteners of the building products can be reduced and/or vertical wall joint gaps can be narrowed, thereby avoiding distortions that may be associated with the fasteners and/or joints and improving aesthetics of the installed building products. In accordance with certain exemplary embodiments, the present disclosure is directed to thermoplastic-based wall boards and related methods for preparing thermoplastic-based wall boards. In certain embodiments, the thermoplastic-based wall boards are suitable for use an exterior cladding, such as vinyl siding. In accordance with certain other exemplary embodiments, the present disclosure is directed to thermoplastic-based composite decking and related methods for preparing thermoplastic-based composite decking.

The thermoplastic-based building products include at least one thermoplastic-based support layer. To reduce expansion and/or contraction, the thermoplastic-based building products of the present disclosure at least partially embed at least one reinforcing flexing layer having a CLTE of less than or equal to 15 ppm/° C. over the temperature range of −20° C. to 70° C. in the at least one thermoplastic-based support layer of the building product. The resulting thermoplastic-based building products exhibit a CLTE that is at least 40% lower than the CLTE of the thermoplastic-based support layer of the building products, preferably at least a 45% lower, and more preferably at least 50% lower. In other words, a comparable building product produced without the at least one reinforcing flexing layer will have a higher CLTE than the thermoplastic-based building products of the present disclosure and therefore will be more susceptible to greater expansion and/or contraction and the resulting distortions or damage than the building products of this disclosure.

One exemplary embodiment is directed to a thermoplastic-based building product having a front face with a length and a width, an opposing back face, opposing top and bottom edges each with a thickness. The building product comprises at least one thermoplastic-based support layer, and at least one reinforcing flexing layer having a CLTE of less than or equal to about 15 ppm/° C. over the temperature range of −20° C. to 70° C. The at least one reinforcing flexing layer is at least partially embedded in the at least one thermoplastic-based support layer along a longitudinal axis of the building product. In accordance with the preceding and other embodiments, the thermoplastic-based building product is a thermoplastic-based wall board or thermoplastic based composite decking.

Unless otherwise indicated herein, the term "embed" or "embedded" refers being enveloped, enclosed, fixed, or embossed in a surrounding mass. In accordance with the present disclosure, the "at least one reinforcing flexing layer is at least partially embedded in the at least one thermoplastic-based support layer" includes embodiments in which the at least one reinforcing flexing layer is at least partially enveloped, enclosed, fixed, or embossed in the at least one thermoplastic-based support layer such that a surface or a portion of a surface of the at least one reinforcing flexing layer is exposed, or embodiments in which the in which the at least one reinforcing flexing layer is fully or completely enveloped, enclosed, fixed, or embossed within the at least one thermoplastic-based support layer. In certain embodiments, the at least one reinforcing flexing layer is preferably fully or completely enveloped, enclosed, fixed, or embossed within the at least one thermoplastic-based support layer In accordance with certain embodiments, the at least one reinforcing flexing layer is embedded substantially in the center of the at least one thermoplastic-based support layer. Unless otherwise indicated herein, "substantially in the center" refers to a position of the material that that is within 85% of the distance from the center of the thickness of the material, including within 75% of the distance from the center, including within 50% of the distance from the center, including within 40% of the distance from the center, including within 30% of the distance from the center, including within 25% of the distance from the center, including within 15% of the distance from the center, including within 10% of the distance from the center, including within 5% of the distance from the center, and including the actual center of the thickness of the material. For example, if the thickness of the material is 40 mils (e.g., the thickness between the front face and back face of the at least one thermoplastic-based building product), the center of the thickness would be 20 mils, and "substantially in the center" refers to a position of that can be within 17 mils from the center of the material (85%×20 mils).

The at least partially embedded position of the at least one reinforcing flexing layer substantially in the center of the at least one thermoplastic-based support layer functions to minimize or avoid the buckling, distortions, or damage that occurs in conventional thermoplastic-based building products. The at least partially embedded position helps avoid camber that may be caused by uneven support against thermal expansion and contraction resulting from a reinforcing flexing layer applied externally to the building product, e.g., laminating or adhering the reinforcing flexing layer on the backside or other external surface of a building product.

An additional exemplary embodiment is directed to a thermoplastic-based building product having a front face with a length and a width, an opposing back face, opposing top and bottom edges each with a thickness. The building product comprises at least one thermoplastic-based support layer comprising a thermoplastic polymer selected from at least one of polyvinyl chloride, polyethylene, polypropylene, and combinations thereof; and at least one reinforcing flexing layer comprising a fiberglass impregnated tape containing unidirectional continuous fiberglass fibers. The at least one reinforcing flexing layer is embedded substantially in the center of the at least one thermoplastic-based support layer along a longitudinal axis of the building product, wherein the at least one reinforcing flexing layer has a CLTE of less than or equal to about 15 ppm/° C. over the temperature range of −20° C. to 70° C. The building product has a CLTE of about 7 to about 45 ppm/° C. over the temperature range of −20° C. to 70° C.

Thermoplastic-Based Support Layer

As previously discussed, at least one (i.e., one or more than one) thermoplastic-based support layer is utilized in accordance with the building products and methods disclosed herein.

The at least one thermoplastic-based support layer includes at least one thermoplastic polymer. Examples of suitable thermoplastic polymers that may be utilized as the at least one thermoplastic polymer include, but are not limited to, polyvinyl chlorides (PVC) such as rigid PVC, polyethylenes such as high density polyethylene (HDPE), polypropylenes, polystyrenes, acrylonitrile butadiene styrenes (ABS), polycarbonates, polyamides, polyether ether ketones (PEEK), polybutylene terephthalates (PBT), polyoxymethylenes (POM), polytetrafluoroethylenes (PTFE), polyesters, engineering thermoplastics, combinations thereof, and the like. In certain embodiments, the polymer is primarily or entirely PVC or rigid PVC. In certain embodiments, the polymer is primarily polyethylene, preferably HDPE. In certain embodiments, the polymer is primarily polypropylene. In certain embodiments, the thermoplastic polymer is selected from at least one of polyvinyl chloride, polyethylene, polypropylene, and combinations thereof.

In certain embodiments, the thermoplastic-based support layer may further comprise about 5% to about 85% by weight of fiber reinforcement and/or filler(s), including from about 5% to about 60% of fiber reinforcement and/or filler(s).

In certain embodiments, about 5% to about 85% by weight of one or more fillers, including from about 5% to about 60%, including from about 20% to about 60%, including from about 40% to about 60% is utilized. Non-limiting examples of suitable fillers include, but are not limited to, mineral fillers such as talc, calcium carbonate, and the like; an impact modifier, such as acrylic, methacrylate-styrene-butadiene, chlorinated polyethylene based polymers; a bonding agent; a lubricant; a plasticizer; a stabilizer; an anti-oxidant; an ultra-violet absorber; a dye, a colorant; a pigment; cellulose filler such as cellulose or natural fibers, wood flour, and paper byproducts; a coupling agent; a surfactant, a compatibilizer, an acid scavenger, and the like. Depending on the type and amount, the filler may be considered a reinforcing filler to the thermoplastic-based support layer. In certain embodiments, the thermoplastic-based support layer comprises about 40% to about 60% by weight cellulose filler, such as wood flour, paper byproducts, or cellulose fibers.

In certain embodiments, about 5% to about 50% by weight, including about 20% to about 50% by weight, including from about 30% to about 50%, including from about 40% to about 50% fiber reinforcement is utilized. Various types of fiber reinforcement may be utilized. In certain embodiments, the fiber reinforcement is at least one of carbon fibers or glass fibers. In certain embodiments, the fiber reinforcement is carbon fiber. Various types of glass fibers are suitable for use, including, but not limited to, fiberglass products having a length of at least about 0.5 inch, preferably about 0.5 inch to about 1 inch, and in certain instances about 0.5 inch. Commercially available examples of such fiberglass includes DS5102-13C (available from Owens Corning of Toledo, Ohio). Preferably the aspect ratio of the fibers is such that the fibers are relatively long (as provided in the foregoing ranges) with a relatively small diameter.

In certain embodiments, the thermoplastic-based support layer has an average thickness of about 10 mils to about 1,590 mils, including about 10 mils to about 490 mils, including about 40 mils to about 400 mils, including about 50 mils to about 350 mils, including about 70 mils to about 250 mils, including about 100 mils to about 150 mils, including about 490 mils to about 1,590 mils, including about 800 mils to about 1000 mils, and including about 200 mils to about 300 mils. The average thickness is referred to herein (for the thermoplastic-based building product, including wall boards and composite decking, and for the thermoplastic-based support layer) because the thickness may not be consistent throughout the profile of the layer.

Reinforcing Flexing Layer

At least one (i.e., one or more than one) reinforcing flexing layer is utilized in accordance with the building products and methods disclosed herein. As discussed above, the at least one reinforcing flexing layer is at least partially embedded in the at least one thermoplastic-based support layer along a longitudinal axis of the building product. As discussed above, in certain embodiments, the reinforcing flexing layer is fully or completely embedded in the at least one thermoplastic-based support layer. The building products of the present disclosure typically have an elongated shape in which the length of the building product is substantially longer than the width of the product. The longitudinal axis, shown for example as "L" in FIG. 1, refers to an axis that follows the length of the building product.

In certain embodiments, the reinforcing flexing layer includes a flexible fiber-containing material. In certain embodiments, the fibers of the fiber-containing material include glass fibers, carbon fibers, natural fibers such as flax fibers, bamboo fibers, banana fibers and/or other cellulose fibers in general, synthetic fibers including synthetic polymer fibers such as aramid fibers. An example of such fiber-containing material includes, but is not limited to a tape, preferably a tape containing unidirectional continuous fibers. In certain embodiments, including embodiments in which the reinforcing flexing layer is a tape, the reinforcing flexing layer includes a binder compatible with the thermoplastic-based support layer. While the binders generally act to bind the fibers together or bind fibers to a backing of some sort, the binder also at least partially bonds the fiber material (e.g., tape) to a surface of the thermoplastic-based support layer. Non-limiting examples of such binders may include a PVC-based binder, a polyester-based binder such as a polyethylene terephthalate (PET) or polyethylene terephthalate glycol-modified (PETG), an olefinic-based binder, and the like. In certain embodiments, the binder is a resin selected based on its compatibility with the thermoplastic-based support layer. In certain of the preceding embodiments, the binder is a polymeric resin selected based on its compatibility with the thermoplastic-based support layer. In certain embodiments, the binder is a thermoplastic or thermoset polymeric material selected based on its compatibility with the thermoplastic-based support layer.

In certain embodiments, the least one reinforcing flexing layer includes a fiberglass impregnated tape; a carbon fiber impregnated tape; a natural fiber impregnated tape such as a flax fiber impregnated tape; a bamboo fiber impregnated tape; a banana fiber impregnated tape, or a cellulose fiber impregnated tape; or a synthetic fiber impregnated tape such as an aramid fiber impregnated tape. In certain embodiments, preferably the tapes, such as the fiberglass impregnated tape, the carbon fiber impregnated tape, the natural fiber impregnated tape, and the synthetic fiber impregnated tape, contain unidirectional continuous fibers. In certain embodiments, the at least one reinforcing flexing layer is a tape selected from fiberglass impregnated tape, carbon fiber impregnated tape, natural fiber impregnated tape, or synthetic fiber impregnated tape.

In certain embodiments, including embodiments in which the reinforcing flexing layer is a tape, the reinforcing flexing layer contains an adhesive on at least one surface of the reinforcing flexing layer. In certain of the preceding embodiments, at least one adhesive layer is utilized adjacent to at least one surface of the reinforcing flexing layer. In such embodiments, the adhesive layer may be separate from the reinforcing flexing layer, e.g., the adhesive layer is introduced as a separate layer during the preparation of the thermoplastic-based building product. The adhesive at least partially bonds the reinforcing flexing layer to the thermoplastic-based support layer in the thermoplastic-based building products.

In certain of the embodiments disclosed herein, at least one reinforcing flexing layer is bonded to a surface of the at least one thermoplastic-based support layer. The bonding can be at least partially attributable to the aforementioned binder or adhesive, or a result of physical and/or chemical processing during the production of the building products, e.g., as a result of compression molding or extrusion. In certain such embodiments, when the at least one reinforcing flexing layer is fully embedded in the at least one thermoplastic-based support layer, the at least one reinforcing flexing layer is bonded to one or more internal surfaces of the thermoplastic-based support layer adjacent to the at least one reinforcing flexing layer.

In certain embodiments, one reinforcing flexing layer is bonded to the surface of two thermoplastic-based support layers and is sandwiched between those two support layers. In certain such embodiments, the reinforcing flexing layer is embedded (enclosed) within the two thermoplastic-based support layers. In other words, the reinforcing flexing layer is entirely encased within the two thermoplastic-based support layers and is not exposed (other than at any cut end, where it will necessarily be exposed).

In certain embodiments disclosed herein, more than one reinforcing flexing layer can be utilized such that multiple reinforcing flexing layers are bonded together prior to being assembled with two thermoplastic-based support layers. In certain such embodiments, more than one reinforcing flexing layer can be utilized such that multiple reinforcing flexing layers are bonded together either at 0 degrees orientation or 90 degrees orientation with respect to each other, prior to being assembled with the at least one (one or more) thermoplastic-based support layer. In certain other embodiments, two or more reinforcing flexing layers are utilized and each is bonded to one surface (i.e., an opposing surface) of at least one thermoplastic-based support layer. Each thermoplastic thermoplastic-based support layer surface may be compressed together to form a thermoplastic-based building product having the two or more reinforcing flexing layers sandwiched in-between. In certain other embodiments, more than one reinforcing flexing layer can be utilized with one or more thermoplastic-based support layer(s) such that there are multiple, separate reinforcing flexing layers spaced between the one or more thermoplastic-based support layer(s).

In certain embodiments, the at least one reinforcing flexing layer is bonded to the surface of the at least one thermoplastic-based support layer. In certain embodiments, the at least one reinforcing flexing layer is heat bonded to the surface of the at least one thermoplastic-based support layer. In certain embodiments, the at least one reinforcing flexing layer is adhered to the surface of the at least one thermoplastic-based support layer. In certain embodiments, the at least one reinforcing flexing layer is co-extruded with the at least one thermoplastic-based support layer. In certain embodiments, the at least one reinforcing flexing layer is manually fed into a PVC sheet extrusion line and bonded as an outermost surface to the extrudate. In certain of the preceding embodiments, the at least one reinforcing flexing layer is bonded, adhered, extruded, or somehow otherwise joined to the thermoplastic-based support layer in a manner such that the reinforcing flexing layer is at least partially embedded or fully embedded in the at least one thermoplastic-based support layer, or is further processed, e.g., molded, compressed, extruded, etc., in a manner that results in the at least one reinforcing flexing layer partially or fully embedded in the at least one thermoplastic-based support layer.

According to the thermoplastic-based building products and methods disclosed herein, the at least one reinforcing flexing layer has a CLTE of less than or equal to about 15 ppm/° C. over the temperature range of −20° C. to 70° C. In certain such embodiments, the CLTE is about 7 to about 15 ppm/° C., and including about 10 to about 15 ppm/° C. over the temperature range of −20° C. to 70° C.

In certain embodiments, the at least one reinforcing flexing layer has a thickness of about 10 mils to about 30 mils, including a thickness of about 10 mils to about 20 mils, and including a thickness of about 10 mils to about 15 mils.

Outermost Top Layer

At least one (i.e., one or more than one) outermost top layer is optionally utilized in accordance with the building products and methods disclosed herein. In certain embodiments, such as vinyl siding exterior cladding wall boards, the outermost top layer may be referred to as the capstock layer. In accordance with certain embodiments herein, where the thermoplastic-based building product has a front face with a length and a width, an opposing back face, opposing top and bottom edges each with a thickness, the outermost top layer is at least one face, e.g., the front face and optionally the back face, the top edge, and/or bottom edge of the building product.

This outermost top layer is a weatherable surface comprising various materials, including one or more thermoplastic or thermosetting polymers. Non-limiting examples of such polymers suitable for use with the outermost top layers disclosed herein include polyurethanes, aliphatic polyurethanes, polyacrylics, PVCs such as rigid PVC, polyvinylidene difluorides (PVDF), acrylonitrile styrene acrylates (ASA), olefin-based polymers such as polyethylenes or polypropylenes, olefin-based ionomers, combinations thereof, and the like. When the outermost top layer comprises a polymeric material, the outermost top layer may also include various additives and fillers known to those skilled in the art, such as UV protectants and antioxidants, to improve weatherability of the surface. Generally, the outermost top layer may be a film or a coating and may be extruded including co-extruded (with the at least one thermoplastic-based support layer and/or at least one reinforcing flexing layers), calendared, sprayed, or laminated. When the outermost top layer is co-extruded, it is preferably a thermoplastic polymer; when it is laminated it is preferably a thermoplastic polymer.

In certain embodiments, the outermost top layer is bonded to at least one surface (e.g., an outer surface) of the at least one reinforcing flexing layer or to a surface of the at least one thermoplastic-based support layer. This may be accomplished through heat bonding the outermost top layer to the at least one thermoplastic-based support layer or the at least one reinforcing flexing layer. Alternatively or in addition, this may be accomplished via co-extrusion or other form of bonding.

According to certain embodiments, the at least one outermost top layer has a thickness of about 1 mils to about 50 mils, including about 1 mils to about 40 mils, including about 1 mils to about 30 mils, including about 1 mils to about 20 mils, and including about 1 mils to about 10 mils.

Overall Wall Board Shape and Design

Figure 2:
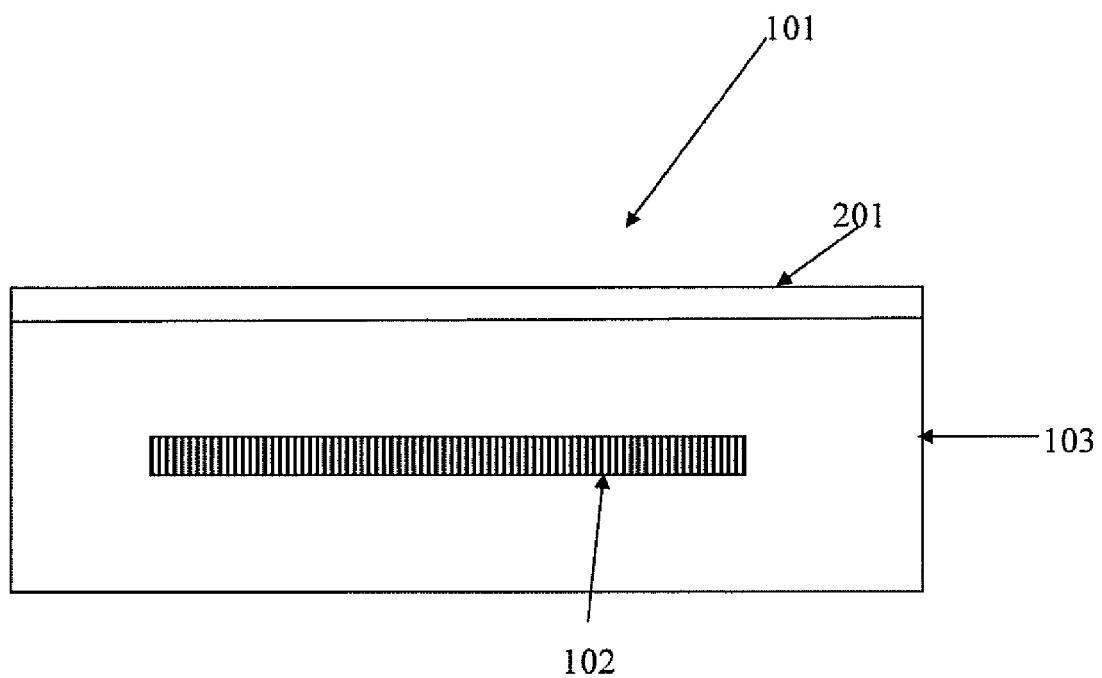
FIG. 2 shows a cross-sectional profile view of an exemplary thermoplastic-based building product according to the present disclosure.

Generally, the thermoplastic-based wall boards will be elongated, i.e., longer than they are wide. Lengths will vary substantially depending upon the particular end-use application, but generally the boards will be manufactured and cut into desirable lengths prior to shipping from the manufacturing facility. FIG. 1 shows an exemplary elongated thermoplastic-based building product 101 of the present disclosure. "L" is the longitudinal axis of the building product 101. The longitudinal axis typically follows the linear direction of the machining if the product is produced by a linear machine technique such as, for example, extruding. The reinforcing flexing layer 102 is fully embedded (encased) by the thermoplastic based support layer 103. FIG. 2 shows the cross sectional profile of another exemplary thermoplastic-based building product 101, but with the optional outermost top layer 201 disposed adjacent to the thermoplastic based support layer 103.

As to thickness, the thickness will largely depend on the end use of the thermoplastic based building product. For example, in certain embodiments, when the thermoplastic based building material is a thermoplastic based wall board, the wall board has an average thickness of about 25 mils up to about 500 mils, including about 50 mils to about 410 mils, including about 60 mils to about 360 mils, including about 80 mils to about 260 mils, and including about 110 mils to about 160 mils. In certain embodiments, when the thermoplastic based building material is a thermoplastic based composite decking, the composite decking has an average thickness of about 500 mils up to about 1600 mils, including about 800 mils to about 1000 mils, and including about 200 mils to about 300 mils. As discussed above, the average thickness is referred to for the thermoplastic-based building product, including the various components that comprise the building product, because thickness may not be consistent through the profile. In certain embodiments, the thermoplastic-based building product has a profile such that the thickness at bottom edge is greater than the thickness at the top edge, e.g., a wedge-shaped profile. Accordingly, in certain embodiments, the each of the top and bottom edge has a thickness. In certain such embodiments, the thickness of each of the top and bottom edges ranges from about 25 mils to about 1,600 mils. In certain embodiments, the thermoplastic-based building product is designed with a tongue and groove type design so as to aide in installation. In certain embodiments, the building product will have a leg-type protrusion to aid in installation of a wall board to a wall or outer surface of a building.

The external surface of the thermoplastic-based building product may be textured or smooth. Thus, when the thermoplastic-based support layer is the external surface, the thermoplastic-based support layer may be textured or smooth. Alternatively, when the outermost top layer is the external surface, the outermost top layer is textured or smooth.

Coefficient of Linear Thermal Expansion

According to certain embodiments of the present disclosure, the thermoplastic-based building product has a coefficient of linear thermal expansion (CLTE) about 7 to about 45 ppm/° C. over the temperature range of −20° C. to 70° C. Generally, the closer to 7 that the CLTE is, the better the building product will perform as relatively less unwanted expansion will occur. In certain embodiments, the CLTE is about 20 to about 40 ppm/° C. over the temperature range of −20° to 70° C. In certain embodiments, the CLTE is about 20 to about 30 ppm/° C., and in other embodiments, the CLTE is about 30 to about 40 ppm/° C., over the temperature range of −20° to 70° C.

As discussed above, thermoplastic-based building products exhibit a CLTE that is at least 40% lower than the CLTE of the thermoplastic-based support layer of the building products alone (i.e., the CLTE of just the support layer), preferably at least a 45% lower, and more preferably at least 50% lower.

Methods for Preparing the Thermoplastic-Based Wall Board

Another exemplary embodiment is directed to a method for preparing a thermoplastic-based building product having a front face with a length and a width, an opposing back face, opposing top and bottom edges each with a thickness. The method comprises (a) preparing at least one thermoplastic-based support layer; (b) bonding at least one reinforcing flexing layer to at least one surface of the at least one thermoplastic-based support layer, and (c) optionally bonding at least one outermost top layer to a surface of the at least one reinforcing flexing layer or to a surface of the at least one thermoplastic-based support layer.

It should be understood that the thermoplastic-based support layer can be prepared by various methods known to those skilled in the art of producing elongated building products such as vinyl siding or composite decking. In certain embodiments, the support layer is prepared by extruding or molding. Various types of extruding may be utilized, including extrusion processes traditionally used for manufacture of vinyl siding products, composite decking products, or other elongated types of building products.

In certain embodiments, the bonding of the at least one reinforcing flexing layer to the at least one surface of the at least one thermoplastic-based support layer takes place by extruding, calendaring, molding, or laminating. Various types of extruding can be utilized for the foregoing bonding, including, but not limited to, crosshead extrusion, profile extrusion, sheet extrusion, compression molding, blow molding, rotomolding, and long fiber thermoplastics molding. In certain embodiments, the at least one reinforcing flexing layer has been extruded, calendered, compression molded, blow molded, rotomolded, or laminated with at least one thermoplastic-based support layer. It should be understood that this bonding step (b) is not necessarily exclusive of the preparing the support layer step (a), as the two steps may be the same or overlap in function.

As discussed above, in certain embodiments, the at least one reinforcing flexing layer is provided by tape, optionally by more than one tape strip that has been bonded or laminated together prior to being bonded to the at least one thermoplastic-based support layer. The binder or adhesive associated with the tape may assist in bonding the tape to the at least one at least one thermoplastic-based support during the extruding, calendaring, molding, or laminating. In certain embodiments, the bonding is heat bonding, which may occur as a result of separately heating the tape prior to incorporation into the at least one thermoplastic-based support layer, or as a result of heat applied or generated during the actual process or step of extruding, calendaring, molding, or laminating. In certain embodiments, the tape has been heat bonded to the thermoplastic-based support layer, preferably at a temperature of about 300° F. to about 400° F.

In certain such embodiments, when the at least one thermoplastic-based support layer is an external surface of the building product, the method may further include applying texture to the at least one thermoplastic-based support layer.

Furthermore, in certain embodiments, at least one outermost top layer is bonded to the at least one reinforcing flexing layer or to a surface of the at least one thermoplastic-based support layer by extruding (including co-extruding), calendaring, spraying, or laminating. In certain such embodiments, the method further includes applying texture to the at least one outermost surface.

Another exemplary embodiment is directed to a method for preparing a thermoplastic-based wall board having a front face with a length and a width, an opposing back face, opposing top and bottom edges each with a thickness. The method comprises (a) preparing at least one thermoplastic-based support layer having an average thickness of about 10 mils to about 490 mils, including about 40 mils to about 400 mils, including about 50 mils to about 350 mils, including about 70 mils to about 250 mils, including about 100 mils to about 150 mils; (b) bonding at least one reinforcing flexing layer having a thickness of about 10 to about 30 mils, preferably about 10 to about 20 mils, to at least one surface of the at least one thermoplastic-based support layer, and (c) optionally bonding at least one outermost top layer having a thickness of about 1 to about 10 mils to a surface of the at least one reinforcing flexing layer or to a surface of the at least one thermoplastic-based support layer.

EXAMPLES

The following examples illustrate certain exemplary embodiments according to the present disclosure. The examples are given solely for the purpose of illustration and are not to be construed as limitations of the general inventive concepts, as many variations thereof are possible without departing from the spirit and scope of the general inventive concepts.

CLTE Analytical Method

Unless otherwise described herein, the respective CLTE measurements of the specimens disclosed in these Examples were obtained in the following manner. A sample, predominantly rectangular in shape, was taken from the specimen to be tested and subjected to a thermomechanical analysis (TMA) using a TMA Q400 Thermomechanical Analyzer at a temperature setting range of −20° C. to 70° C. using a ramping method of 4° C./min and a $N_2$ purge rate of 50 mL/min. All samples were polished with sand paper before introduction into the TMA. These measurements were obtained in accordance with ASTM E831.

Comparative Example 1—Preparation of PVC Control Sample and Comparative Fiber Reinforced PVC Samples For this Comparative Example, neat, rigid polyvinyl chloride polymer was utilized as the control (referred to herein as "PVC Control"). Three different experimental compositions were prepared using the same polyvinyl chloride in combination with: 30 wt % 0.5 inch glass fiber (Comparative Example 1A and 1B), 50 wt 0.5 inch glass fiber (Comparative Examples 1C and 1D), and 20 wt % short fiber carbon fiber (Comparative Example 1E).

Unless otherwise indicated, the polyvinyl chloride used in the Examples of the present disclosure was enhanced PVC (also denoted herein as ePVC, available from Americhem, Inc. of Cuyahoga Falls, Ohio). The glass fibers used were fiberglass and commercially available. Specifically, the 0.5 inch glass fibers were DS5102-13C, 13 micrometer filament diameter (Owens Corning, Toledo, Ohio), Advantex® glass type-boron free fibers. The fiberglass was sized by the manufacturer to increase compatibility with the polyvinyl chloride. The carbon fibers used were short carbon fiber, i.e., about 200-300 mils length, and generally having a diameter of 7 µm and commercially available as PAN (polyacrylonitrile)-precursor, milled carbon fiber from Finite Fiber of Akron, Ohio. The carbon fibers were sized by the manufacturer to increase compatibility with the polyvinyl chloride.

A single screw extruder was utilized for the long fiber extrusion (Model No. 150S2310 from C.A. Lawton Company, Wisconsin). The barrel of the extruder was approximately 3 inches in diameter and had a length to diameter ratio of about 80:1. It was not equipped with any barrel cooling. The extruder had 10 electric zones, with the last zone allowing for material accumulation and pushing out of a charge based on a programmed finite length of screw turns. It was also configured so that a hot, compounded charge could be placed into an attached mold for compression molding. For these Examples an 11 inch×18 inch mold was utilized. The resulting samples produced from this mold were about 11 inch×about 18 inches×about 250 mils.

The melt temperature of the extrudate was measured to be 415° F. The mold conditions were 165° F. and 3,000 psi, 30 seconds of cycle time. 10 neat PVC panels were molded. These panels were the PVC Control. The CLTE was obtained for the PVC Control and is shown in Table 1 below.

Then, about 30 lbs PVC comprising 30 wt % of the 0.5 inch glass fibers (typically referred to as "long fiber") was added to the extruder and the output was slowed to provide more residence time in the barrel. At the natural polyvinyl chloride to glass-fiber product transition, the first panel that was molded contained random, high fiber concentration regions. Thereafter, with the additional residence time, more uniform looking panels were produced (filled out and homogeneous appearance). The melt temperature of the extrudate was measured to be 450° F. 10 panels were produced. The CLTE was measured and shown in Table 1 below as Comparative Examples 1A and 1B. Comparative Example 1A refers to the CLTE measured through the cross section, middle of the panel sample being measured (e.g., measured near the centerline of the cross section), and Comparative Example 1B refers to the measurement of the cross section, near the outer edge of the same sample.

Thereafter, a bucket of neat polyvinyl chloride was placed in the hopper to mark the transition to the next trial. Then, about 30 lbs PVC comprising 50 wt % of the 0.5 inch glass fibers (long fiber) was added to the extruder, and allowed to sit for a few minutes to ensure mixing. The molded panels improved in fiber distribution and homogeneity with each progressive sample, and even though the parts were never filled out entirely, they were reasonable in overall appearance. The melt temperature of the extrudate was measured to be 450° F. 10 panels were produced. The CLTE was measured and shown in Table 1 below as Comparative Examples 1C and 1D. Comparative Example 1C refers to the CLTE measured through the cross section, middle of the panel sample being measured (e.g., measured near the centerline of the cross section), and Comparative Example 1D refers to the measurement of the cross section, near the outer edge of the same sample.

In another trial, about 5 lbs of a general purpose rigid PVC (this is the same PVC as Example 4 below, but not for Comparative Examples 1A-1D) comprising 20 wt % of the short carbon fiber was added to a 25 mm conical counter rotating lab extruder with slit die. The melt temperature of the extrudate was measured to be 380° F. A panel 20 feet long was produced. The CLTE was measured and shown in Table 1 below as Comparative Example 1E.

Example 2—Extruded PVC Containing Fiberglass Tape as the Reinforcing Flexing Layer In this Example, PVC-based support layer panels containing a fiberglass impregnated tape as the reinforcing flexing layer were produced. As discussed in more detail below, the fiberglass impregnated tape contains continuous fiberglass fibers that are unidirectionally oriented in the tape. The tape was bonded to the PVC-based support layer using crosshead extrusion via the use of an aluminum stabilizer strip.

The materials utilized for this Example included 300 lbs. of a beige rigid, enhanced PVC (ePVC, the same ePVC used in Comparative Examples 1A-1D), a commercially available glass fiber tape containing about 60-70 wt % glass fiber and a PETG binder, where the fibers are unidirectionally oriented in the tape. This tape has a 400 gsm (grams per square meter) density and a thickness of about 12 mils. The tape was slit to about 0.5 inch to accommodate the crosshead tooling for this Example.

The extruding equipment utilized in this Example included a 1.5 inch Davis Standard single crosshead extruder with a 60 mesh screen pack at 90° to the stabilizer feed. When the trial began, the line (extruder) was hot at 350° F. and ready to go. Downstream equipment included a chilled water tank with cleated belt puller (RDN Manufacturing Co., Inc., Bloomingdale, Ill.). Strips of crosshead finished product were cut into 3-4 foot long specimens.

The line was strung up with the standard aluminum stabilizer strip ("stabilizer") at about 7 feet/min. Extruder conditions were monitored and found to be stable, with no drift in zone temperatures and the adaptor pressure transducer was about 6,000 psi. The rupture disk was rated for 9,000 psi. The PVC appeared to flow well, and also appeared to bond very well to the aluminum stabilizer. A small about 8× optical comparator on the line was utilized to look at the cross sections. The PVC containing the aluminum stabilizer strip was taken as a control (hereinafter referred to as "Crosshead PVC Control"). The aluminum stabilizer strip is completely embedded/enclosed within the PVC matrix.

Then, after about 10 minutes the tape was spliced in. The tape for this example is completely embedded/enclosed within the PVC matrix. Some outgassing was observed at the die exit which was believed to be from the polyvinyl chloride. Twenty 3 foot strips were taken and placed in a box for later evaluation as Example 2A. Based upon examination of the cross sections, some "waviness" could be seen as the tape wasn't entirely flat like the aluminum strip had been. Some bubbles could also be seen in the tape itself; by monitoring the tape melt on a hot plate near the line it was verified that the tape was softening and releasing/curling stresses within itself.

Thereafter, speed was increased to 15 feet/minute, but no apparent change in tape waviness/distribution across the width of the composite strip resulted. Strips were again taken at this condition as Example 2B. Overall, use of the aluminum strip alone resulted in a flat product, with good adhesion. Use of the tape either results in a somewhat wavy, irregular cross-section, with some internal tape voids, but good adhesion or (after increasing the speed) a generally flat-laying, but still somewhat irregular cross-section, with slight evidence of internal tape voiding.

Thereafter, the temperature was dropped to 340° F., and a spike was observed in extruder adaptor pressure to about 8,000 psi. Conditions were held and dried PVC material was dropped (extruded 2 hours at 150° F.), but no changes were observed. Overall, no line breaks occurred and no issues were identified other than the quality of the tape. Over time some "fuzzing" was observed at the crosshead die inlet, and the tape was inconsistent in width, as the tape is somewhat brittle and not very amenable to slitting. All composite finished strips maintained excellent integrity and flexibility. Cohesive tape failure (where the fibers/binder of the tape separated from each other) was observed in the finished parts upon physically pulling apart the sandwich with pliers. The cohesive tape failure showed bonding of the tape to matrix.

CLTE (measured according to ASTM E831) were obtained on the Crosshead PVC Control as well as on Examples 2A and 2B containing the fiber glass tape. Results are provided in Table 1.

As a comparison, the CLTE was obtained for the tape alone, i.e., a single ply of the PETG-glass fiber tape containing about 60-70 wt % glass fiber where the fibers are unidirectionally oriented in the tape. These results are shown in Table 1 as "Unidirectional Fiberglass Tape Control."

Example 3—Dual-Ply PETG Fiberglass Tape and Dual-Ply PET-Containing Fiberglass Tape Another trial was conducted, using modified versions of the fiberglass tape used in Example 2. More specifically, in the first modification, 2 single-ply PETG-fiberglass impregnated tapes (of the type utilized in Example 2) were laminated together to create a larger glass volume cross-ply tape, where the fibers of each ply are oriented at a 0° and 90° with respect to each other. In the second modification, another dual-ply fiberglass tape was prepared in the same manner as the 2 single-ply PETG-fiberglass impregnated tapes of this Example, but it contained a PET binder (which has a lower melting temperature) instead of the PETG binder.

The thermoplastic materials utilized for the trial included 50 lbs. of the same enhanced PVC used in Example 2. The line of the crosshead extruder used in Example 2 was again strung up with the standard aluminum strip ("stabilizer") at about 7 ft/min. The conditions were the same as that of Example 2 with the extruder being flood fed and barrel/die temps set to 360° F., 27 RPM, generating about 5000 psi adaptor pressure. The "lower" melting dual-ply PET-containing tape was spliced in to the aluminum strip by hand, thereby avoiding a line shutdown. The dual-ply tape was found to be more stable in feed generally as compared to the single-ply tape due to the increased thickness and the curling phenomenon at die entry that was observed in the previous was not seen this time.

The resulting strip through the water bath and out of the puller was cut and mechanically separated with pliers to evaluate the polyvinyl chloride bond to the tape. Using the pliers, a cohesive tape failure was not achieved, but an adhesive failure was observed on just the bottom side where the tape pulled completely away from the PVC. A switch was made to the higher melting PETG-fiberglass impregnated dual-ply tape, and the same result was observed. In subsequent tests, a manual heat gun was applied to the PETG dual-ply tape prior to die entry, and a cohesive bond failure was then observed. IR lamps were then brought to the line to substitute for the heat gun. Once again, an adhesive failure was observed in the strip on the bottom of the dual-ply PETG-fiberglass impregnated tape. The heat also decreased the stability/tension of the tape as the tape could not be kept across the entire width of the strip and it curled upon itself in the die.

After a period of operating at 360° F., the extruder temps were dropped and remove the IR heating to "reset" conditions. The tape also appeared to be outgassing in the heat gun/IR lamp portion of this Example. Further, the standard aluminum stabilizer was spliced in to help clean the tool from buildup and this kept the line up and running. The lower melt PET dual-ply tape material was spliced back in and no cohesive failures were observed.

Finally, the high melt PETG-fiberglass impregnated dual-ply was spliced back in at about 360° F. barrel zones, 350° F. die temperature, with IR lamp applied, and cohesive failure was achieved for the second time. Ten 3 ft strips had been cut for each set point roughly. A buildup of glass fiber on the felt pads/vise which likely applied initial tension to the tape.

Overall, both dual-ply tapes were more consistent in width which was an improvement over Example 2. The lower melting PET-containing fiberglass impregnated tape had an increased amount of glass fraying/fuzz as compared to the PETG-containing fiberglass impregnated tape. Both dual tapes were more stable and did not "curl" upon entry to the crosshead die, an improvement over Example 2. Using mechanical pliers no cohesive bond failure was generated with the lower melting PET fiberglass impregnated tape; however, a cohesive bond failure was generated with the higher melting PETG fiberglass impregnated tape.

Example 4—Compression Molded PVC

In another trial, stainless steel molds were designed and constructed. These molds were utilized to compress one or more PVC-containing support layer(s) with a reinforcing flexing layer. The mold were designed so as to minimize lateral movement of the tape (and fibers) during compression. Previous trials had resulted in fibers spreading from side-to-side and the molds were designed to assist the tape in holding its shape. As those skilled in the art will understand molds of differing dimensions, particularly larger molds, applying the same concepts could be designed for commercial production purposes. Unless otherwise indicated, the PVC used in this Example was the same general purpose rigid PVC material utilized in Comparative Example 1E.

Using the molds, a single-ply unidirectional PETG-fiberglass impregnated tape (the type utilized in Example 2) was sandwiched between two layers of PVC matrix. This glass tape PVC sandwich is referred to herein as Example 4A. The thermoplastic materials utilized for the trial included the rigid PVC material. The PVC sandwich was prepared according to the following procedure, about 5 lbs. of the PVC was extruded into about ⅛ inch strips with a 25 mm conical counter rotating extruder. 1 inch×3 inch pieces in the machine direction were cut out of the strips, pressed down further to smaller thicknesses of about 30-70 mils, and a sandwich was assembled with a tape in the middle for a target finished thickness of about 125 mils. Metal shims were utilized to make smaller finished thicknesses. 2 pieces of Teflon were used on the top and bottom of the sandwich to prevent sticking to the mold. The mold was soaked on a Carver press at 400° F. for 1-2 hrs. The sandwich was then placed into the mold and the mold was placed into the press at various pressures of about 500 psi to about 30 tons per square inch for 30 s to 2 min. Upon removal the part, temperature was about 300° F. and placed in between flat stainless steel plates for cooling for about 1-2 min. in a water cooled press. Upon demolding, the glass tape molded PVC "sandwich" was at room temperature and stable with no camber. The CLTE was obtained for this sandwich of Example 4A. Results are provided in Table 1 for Example 4A.

Using the molds, 2 single-ply PETG-fiberglass impregnated tapes (the type utilized in Example 2) were sandwiched between three alternating layers of PVC matrix. This 2-glass tapes PVC sandwich (layered between 3 layers of PVC) is referred to herein as Example 4B. The thermoplastic materials utilized for the trial included 1 lb. of the rigid PVC compound. The PVC sandwich was prepared same as above however, the sandwich was assembled with alternating layers of PVC (3 total layers) and tape (two total layers) such that the tapes were symmetrically distributed throughout the cross-section to form the two glass tape molded PVC "sandwich." Specimens were also prepared with 3 layers of single-ply tapes laminated to each other in between 2 layers of PVC, at 0° orientation to each other (thus creating a multilayer unidirectional fiber tape). The tapes adhered to themselves with heat and pressure of the mold. The 3 glass layer PVC "sandwich" (between the 2 layers of PVC) is referred to herein as Example 4C. The CLTE was obtained for these sandwiches of Examples 4B and 4C. Results are provided in Table 1 for Examples 4B and 4C.

Example 5—Compression Molded Polypropylene

Using the molds described in Example 4, a single-ply 85 wt % aramid fiber impregnated tape containing a polypropylene binder was sandwiched between two layers of a polypropylene resin matrix. The aramid fiber impregnated tape has a 178 gsm density. The polypropylene utilized for the trial included 1 lb. of a 35 MI homopolymer polypropylene (from Braskem of Philadelphia, Pa.). The resin was fluxed in a Wright split bowl mixer and pressed out with a Carver press to about 70 mils thickness sheets. The sheets were assembled with the tape as above but at a press temperature of 450° F. and primarily 500 psi pressure to create a polypropylene(PP)/aramid fiber impregnated tape molded "sandwich." The CLTE was obtained for this sandwich. Results are provided in Table 1.

As a comparison, the CLTE of the polypropylene alone, i.e., without the aramid fiber impregnated tape, subjected to the same conditions discussed above in Example 5 was obtained. The results are shown in Table 1 as "Polypropylene Control."

Example 6—Compression Molded HDPE

Using the molds described in Examples 4 and 5, a commercially available single-ply 60-70 wt % fiberglass impregnated tape containing an olefin-type binder was sandwiched between two layers of a high density polyethylene (HDPE) based-resin matrix. The polyethylene utilized for the trial included 5 lbs. of a commercially available HDPE composite containing about 50% by weight rice hulls and paper byproduct filler. The HDPE-composite resin was milled on a hot 2 roll mill and pressed out to thicknesses of about 60-125 mils. Sandwiches were prepared in the manner described above (e.g., in Examples 4A and 5) at a press temperature of 440° F. to create a HDPE-composite/tape molded "sandwich." The CLTE was obtained for this sandwich. Results are provided in Table 1 as Example 6 (the CLTE measurements were duplicated, and both results are shown in Table 1).

As a comparison, the CLTE of the commercially available HDPE composite alone, i.e., without the fiberglass impregnated tape of this Example, subjected to the same conditions under the mold discussed above (in Example 6) was obtained. The results are shown in Table 1 as "HDPE Composite Control."

As a further comparison, the CLTE of neat HDPE, subjected to the same conditions under the mold discussed above (in Example 6) was also obtained. The results are shown in Table 1 as "HDPE Control."

Comparative Example 7—Other Materials

As a comparison, the CLTE of other commercially available products was obtained. These results are shown in Table 1 as Comparative Examples 7A-7F.

Comparative Example 8—Tape Laminated to PVC Siding

A single-ply strip of the fiberglass impregnated unidirectional tape employed in Example 2 (with PETG binder) was laminated to a commercially available piece of PVC siding at 80 feet/minute. This was accomplished under the following conditions: several discreet tape lengths of 1-2 feet were fed by hand into an embosser nip, where the tape stuck and traversed through the siding line. The siding was not able to be calibrated to shape due to the tape interrupting the melt. The CLTE for this sample was obtained and listed in Table 1 as Comparative Example 8. Although the CLTE at 27 ppm/° C. is consistent with the samples prepared in which the tape is completely embedded within the PVC matrix, it should be understood that this tape-laminated PVC siding distorted (i.e., exhibited camber) during the lamination of the tape to the PVC siding. Such camber did not occur in the specimens obtained from Examples 2-6.

TABLE 1

| Example | Description | CLTE Result (ppm/° C.), −20° C. to 70° C. |
|---|---|---|
| Comparative Example 7A | ACCOYA Wood (commercial acetylated wood product) | 4 |
| Comparative Example 7B | ULTREX (commercial polyester thermoset Apex pultrusion product) | 5 |
| Comparative Example 7C | GAMRA PUR (commercial polyurethane thermoset pultrusion) | 5 |
| Comparative Example 7D | HARDIE board (commercial board fiber cement product) | 6 |
| Unidirectional Fiberglass Tape Control | Unidirectional fiberglass tape (PETG binder, about 60-70% by weight glass) | 10 |
| Example 4C | 3 glass layer PVC sandwich | 14 |
| Comparative Example 1C | 50% glass fiber reinforced (long fiber) PVC | 19 |
| Comparative Example 7E | BORAL trim board (commercial thermoset foamed polyurethane reinforced with fly ash) | 20 |
| Comparative Example 1E | 20% carbon fiber reinforced (short fiber) PVC | 22 |
| Comparative Example 1D | 50% glass fiber reinforced (long fiber) PVC | 22 |
| Example 4B | 2 glass tapes molded PVC sandwich | 23 |
| Example 2A | Crosshead PVC-glass strip, 7'/minute | 25 |
| Example 5 | PP/aramid fiber impregnated tape sandwich | 25 |
| Example 4A | Molded PVC/tape sandwich | 26 |
| Example 2B | Crosshead PVC-glass strip, 15'/minute | 27 |
| Comparative Example 8 | PVC Siding with glass tape laminated to back side | 27 |
| Comparative Example 1A | 30% glass fiber reinforced (long fiber) PVC | 33 |
| Comparative Example 1B | 30% glass fiber reinforced (long fiber) PVC | 37 |
| Crosshead PVC Control | Crosshead PVC-metal strip, 7'/minute | 38 |
| Example 6 | HDPE composite/tape molded sandwich | 37, 40 |
| Comparative Example 7F | Foamed, filled PVC cladding (EVERLAST Polymeric Cladding, a commercial product of foamed rigid PVC profile piece, reinforced with talc available) | 41 |
| PVC control | PVC (neat PVC) | 65 |
| HDPE Composite Control | HDPE composite material | 75 |
| Polypropylene Control | Polypropylene (neat polypropylene) | 103 |
| HDPE Control | HDPE (neat HDPE) | 129 |

As discussed above, the CLTE results in Table 1 were measured in accordance with ASTM E831.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the term "in" or "into" is used in the specification or the claims, it is intended to additionally mean "on" or "onto," respectively. Furthermore, to the extent the term "connect" is used in the specification or claims, it is intended to mean not only "directly connected to" but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the general inventive concept.

What is claimed is:

1. A thermoplastic-based building product useable as a wall board or composite decking having a front face with a length and a width, an opposing back face, opposing top and bottom edges each with a thickness, the building product comprising:

at least one outermost top layer comprising a polymer;

at least one thermoplastic-based support layer; and at least one reinforcing flexing layer having a coefficient of linear thermal expansion (CLTE) of less than or equal to about 15 ppm/° C. over the temperature range of −20° C. to 70° C., wherein the at least one reinforcing flexing layer is at least partially embedded in the at least one thermoplastic-based support layer along a longitudinal axis of the building product.

2. The building product of claim 1, wherein the at least one reinforcing flexing layer is a tape selected from fiberglass impregnated tape, carbon fiber impregnated tape, natural fiber impregnated tape, or synthetic fiber impregnated tape.

3. The building product of claim 2, wherein the tape contains unidirectional fibers.

4. The building product of claim 2, wherein the tape contains a binder compatible with the at least one thermoplastic-based support layer.

5. The building product of claim 2, wherein the tape contains an adhesive on at least one surface of the tape.

6. The building product of claim 2, wherein the tape has been heat bonded or bonded with an adhesive to the at least one thermoplastic-based support layer.

7. The building product of claim 1, wherein the at least one reinforcing flexing layer comprises a fiberglass impregnated tape containing unidirectional continuous fiberglass fibers.

8. The building product of claim 7, wherein the at least one reinforcing flexing layer is embedded substantially in the center of the at least one thermoplastic-based support layer.

9. The building product of claim 1, wherein the at least one reinforcing flexing layer is embedded substantially in the center of the at least one thermoplastic-based support layer.

10. The building product of claim 1, wherein the building product includes two thermoplastic-based support layers and the at least one reinforcing flexing layer is sandwiched between the two thermoplastic-based support layers.

11. The building product of claim 1, wherein the building product has a coefficient of thermal expansion of about 7 to about 45 ppm/° C. over the temperature range of −20° C. to 70° C.

12. The building product of claim 1, wherein the building product has a coefficient of thermal expansion of about 20 to about 40 ppm/° C. over the temperature range of −20° C. to 70° C.

13. The building product of claim 1, wherein the at least one reinforcing flexing layer has been extruded, calendered, compression molded, blow molded, rotomolded, or laminated with at least one thermoplastic-based support layer.

14. The building product of claim 1, wherein the at least one thermoplastic-based support layer comprises a thermoplastic polymer selected from at least one of the following: polyvinyl chloride, polyethylene, polypropylene, polystyrene, acrylonitrile butadiene styrene, polycarbonate, polyamide, polyether ether ketone, polybutylene terephthalate, polyoxymethylene, polytetrafluoroethylene, polyester, and combinations thereof.

15. The building product of claim 1, wherein the thickness of each of the top and bottom edges ranges from about 25 mils to about 1,600 mils.

16. The building product of claim 1, wherein the outermost top layer is bonded to a surface of the at least one thermoplastic-based support layer.

17. The building product of claim 1, wherein the building product is a thermoplastic-based wall board.

18. The building product of claim 1, wherein the building product is an exterior cladding for the surface of a building.

19. The building product of claim 18, wherein the building product is vinyl siding.

20. The building product of claim 1, wherein the building product is thermoplastic-based composite decking.

21. The building product of claim 1, wherein the thermoplastic-based support layer comprises about 5% to 85% by weight fiber reinforcement or filler.

22. A thermoplastic-based building product useable as a wall board or composite decking having a front face with a length and a width, an opposing back face, opposing top and bottom edges each with a thickness, the building product comprising:

at least one outermost top layer comprising a polymer;

at least one thermoplastic-based support layer comprising a thermoplastic polymer selected from at least one of polyvinyl chloride, polyethylene, polypropylene, and combinations thereof; and at least one reinforcing flexing layer comprising a fiberglass impregnated tape containing unidirectional continuous fiberglass fibers, wherein the at least one reinforcing flexing layer is embedded substantially in the center of the at least one thermoplastic-based support layer along a longitudinal axis of the building product, wherein the at least one reinforcing flexing layer has a coefficient of linear thermal expansion (CLTE) of less than or equal to about 15 ppm/° C. over the temperature range of −20° C. to 70° C., wherein the building product has a coefficient of thermal expansion of about 7 to about 45 ppm/° C. over the temperature range of −20° C. to 70° C.

* * * * *